United States Patent
Evenden

(10) Patent No.: US 10,575,239 B2
(45) Date of Patent: Feb. 25, 2020

(54) DATA NETWORK MANAGEMENT

(71) Applicant: British Telecommunications Public Limited Company, London (GB)

(72) Inventor: Richard Evenden, London (GB)

(73) Assignee: British Telecommunications Public Limited Company, London (GB)

( * ) Notice: Subject to any disclaimer, the term of this patent is extended or adjusted under 35 U.S.C. 154(b) by 57 days.

(21) Appl. No.: 16/065,914

(22) PCT Filed: Dec. 22, 2016

(86) PCT No.: PCT/EP2016/082471
§ 371 (c)(1),
(2) Date: Jun. 25, 2018

(87) PCT Pub. No.: WO2017/114761
PCT Pub. Date: Jul. 6, 2017

(65) Prior Publication Data
US 2019/0053125 A1 Feb. 14, 2019

(30) Foreign Application Priority Data

Dec. 31, 2015 (EP) ..................................... 15203268

(51) Int. Cl.
*H04W 48/06* (2009.01)
*H04W 28/02* (2009.01)
(Continued)

(52) U.S. Cl.
CPC ............. *H04W 48/06* (2013.01); *H04L 43/16* (2013.01); *H04W 24/02* (2013.01);
(Continued)

(58) Field of Classification Search
CPC . H04W 48/06; H04W 24/02; H04W 28/0236; H04W 28/0289; H04W 28/08; H04W 74/002; H04W 84/12; H04L 43/16
See application file for complete search history.

(56) References Cited

U.S. PATENT DOCUMENTS 8,660,536 B1 * 2/2014 Pogue ................... H04W 88/10
455/411
8,792,361 B2 7/2014 Croot et al.
(Continued)

FOREIGN PATENT DOCUMENTS

WO WO 2012/093349 A2 7/2012
WO WO 2014/012192 A1 1/2014
(Continued)

OTHER PUBLICATIONS

Application and Filing Receipt for U.S. Appl. No. 15/514,994, filed Mar. 28, 2017, Inventor(s): Scahill et al.
(Continued)

*Primary Examiner* — Melvin C Marcelo
(74) *Attorney, Agent, or Firm* — Patterson Thuente Pedersen, P.A.

(57) ABSTRACT

In a WLAN with many concurrent users, a wireless access point is configured with information relating to a set of priority devices and when network utilisation exceeds a particular threshold, the wireless access point is arranged to identify a priority device connected to the WLAN, determine a policy for reconfiguring the WLAN to enable better performance to the priority device, and offer the improvements to the priority device. The changes to the WLAN are only applied if a user of the priority device opts to apply the changes thereby changing the WLAN performance in accordance with user requirements.

11 Claims, 5 Drawing Sheets

(51) Int. Cl.
*H04W 28/08* (2009.01)
*H04W 74/00* (2009.01)
*H04L 12/26* (2006.01)
*H04W 24/02* (2009.01)
*H04W 84/12* (2009.01)

(52) U.S. Cl.
CPC ... *H04W 28/0236* (2013.01); *H04W 28/0289* (2013.01); *H04W 28/08* (2013.01); *H04W 74/002* (2013.01); *H04W 84/12* (2013.01)

(56) References Cited

U.S. PATENT DOCUMENTS

| | | |
|---|---|---|
| 2008/0274745 A1 | 11/2008 | Barak et al. |
| 2010/0284381 A1 | 11/2010 | Hirsch |
| 2010/0296487 A1 | 11/2010 | Karaoguz et al. |
| 2011/0170424 A1 | 7/2011 | Safavi |
| 2011/0268044 A1 | 11/2011 | Yun et al. |
| 2011/0274101 A1 | 11/2011 | Cooper |
| 2012/0094660 A1 | 4/2012 | Radulescu et al. |
| 2012/0252440 A1 | 10/2012 | Watanabe |
| 2013/0012249 A1 | 1/2013 | Cantonza et al. |
| 2013/0017794 A1 | 1/2013 | Klopper et al. |
| 2013/0235759 A1 | 9/2013 | Meshkati et al. |
| 2013/0272285 A1 | 10/2013 | Goldsmith et al. |
| 2013/0281089 A1 | 10/2013 | Chandrasekhar et al. |
| 2014/0036691 A1 | 2/2014 | Madan et al. |
| 2014/0071845 A1 | 3/2014 | Banerjee et al. |
| 2014/0169200 A1 | 6/2014 | Woo |
| 2014/0233416 A1 | 8/2014 | Black et al. |
| 2014/0376426 A1 | 12/2014 | Boudreau et al. |
| 2015/0146548 A1 | 3/2015 | Wang |
| 2015/0105067 A1 | 4/2015 | Valliappan et al. |
| 2016/0269928 A1* | 9/2016 | Kotecha ............ H04L 43/0882 |
| 2017/0171870 A1 | 6/2017 | Wang et al. |
| 2017/0264487 A1 | 9/2017 | Scahill et al. |
| 2017/0272194 A1 | 9/2017 | Scahill et al. |
| 2018/0109998 A1 | 4/2018 | Ringland et al. |
| 2018/0124630 A1 | 5/2018 | Ringland et al. |
| 2018/0124693 A1 | 5/2018 | Ringland et al. |
| 2018/0254979 A1 | 9/2018 | Scahill et al. |

FOREIGN PATENT DOCUMENTS

| | | |
|---|---|---|
| WO | WO 2016/050805 A1 | 4/2016 |
| WO | WO 2016/050807 A1 | 4/2016 |
| WO | WO 2016/050808 A1 | 4/2016 |

OTHER PUBLICATIONS

Application and Filing Receipt for U.S. Appl. No. 15/515,028, filed Mar. 28, 2017, Inventor(s): Scahill et al.
Application and Filing Receipt for U.S. Appl. No. 15/515,059, filed Mar. 28, 2017, Inventor(s): Scahill et al.
International Preliminary Report on Patentability, for PCT/EP2015/072490, dated Apr. 4, 2017, 7 pages.
International Preliminary Report on Patentability, for PCT/EP2015/072487, dated Apr. 4, 2017, 7 pages.
International Search Report and Written Opinion for PCT Application No. PCT/EP2015/072489 dated Dec. 7, 2015; 10 pages.
International Search Report and Written Opinion for PCT Application No. PCT/EP2015/072490 dated Feb. 1, 2016; 9 pages.
International Search Report and Written Opinion for PCT Application No. PCT/EP2015/072487 dated Dec. 7, 2015; 9 pages.
International Preliminary Report on Patentability, for PCT/EP2015/072489, dated Apr. 4, 2017, 8 pages.

* cited by examiner

DATA NETWORK MANAGEMENT

CROSS-REFERENCE TO RELATED APPLICATION

The present application is a National Phase entry of PCT Application No. PCT/EP2016/082471, filed Dec. 22, 2016, which claims priority from EP Patent Application No. 15203268.6, filed Dec. 31, 2015, each of which is hereby fully incorporated herein by reference.

TECHNICAL FIELD

The present disclosure relates to wireless networks and in particular to a method and apparatus for prioritizing access to network resources when the network link is experiencing congestion.

BACKGROUND

Wi-Fi and Home Networks

In wireless communications, the IEEE 802.11 family of standards, known as Wi-Fi is a popular protocol for allowing devices to communicate wirelessly using radio wave transmission. A group of devices all communicating via a common wireless access point is known as a wireless local area network (WLANs).

The wireless access point is also commonly combined with a wired network interface for connectivity with wired devices using an Ethernet protocol (IEEE 802.3) and a wide area network (WAN) interface such as an xDSL modem or cable modem for connectivity to remote networks and resources such as file and video servers via an Internet Service Provider (ISP) and then a wide area network such as the Internet. Such devices will be referred to as a hub.

Fairness in Wi-Fi

In the Wi-Fi standards, all devices forming part of a WLAN communicate using a shared radio frequency channel, currently defined to be a frequency in a 2.4 Ghz or 5 Ghz range. Any transmissions by a device will be receivable by other devices within reception range and therefore if two or more devices transmit at the same time, there will be interference. To avoid the need for a transmission scheduler to coordinate all devices, Wi-Fi devices use Carrier Sense Multiple Access-Collision Avoidance (CSMA-CA) to ensure that a device will only try to transmit when they have listened to the transmission channel and determined that the channel is clear. If the channel is in use, then the device will "back off", i.e., wait a short period of time before trying the channel again. In this way, only one device can transmit on the channel at any given time.

In general, all devices connected to a Wi-Fi network have equal priority. When the channel is deemed to be busy, each device will have similar time-out period before retesting the channel and once acquired, the device has the same opportunity for packet transmission. For example, device A is allowed to transmit 500 packets, and device B is also allowed to transmit 500 packets. Whilst such a scheme provides fairness, if the transmission speed of data packets from device A is much slower than the transmission speed of device B (for example, device A is using a slower transmission scheme for robustness), then device A will lock out the rest of the channel for a much longer period of time, thereby reducing the performance of the network as a whole.

In WLANs, due to the CSMA-CA and fairness policy in Wi-Fi, as the number of connected devices increases, the performance for each individual device connected to the WLAN decreases due to contention for the common channel. At any given time, there is a greater probability that the channel will be in use which will result in any one device having to wait longer before it is able to transmit on the channel.

A large number of visiting devices connecting to a WLAN is problematic for regular users of the WLAN, for example if the main user of a WLAN has visitors and they all connect their personal devices to the WLAN to access network services, then there can be network performance issues for other regular home users of the WLAN. For example, regular users of the WLAN may be subjected to a noticeable drop in performance (for example, slow web page loading times, slow file transfer speeds, dropped video frames and/or bad voice quality) and this can be frustrating.

Quality of Service (QoS)

A device connected to a Wi-Fi network will typically transmit data packets relating to several data applications, for example, file transfer, text, audio, video etc. Each type of application will have different requirements with regards to latency and accuracy. For example the speed of a file transfer is secondary to the requirement for the received data packets to be free of errors and in order. In contrast, for a video streaming application or Voice over Internet Protocol (VoIP) application, dropping packets is preferable to a break in the flow of received and decoded data packets.

To address the different requirements for different services, Quality of Service (QoS) requirements can be defined for the different application types and a packet priority is assigned to packets belonging to each application type. In this way, certain types of traffic to be prioritized for delivery through the network from a sender to a receiver, for example video packets have higher priority than file transfers. This is especially important when there is network congestion.

Whilst QoS provides some control for service prioritization, it is not widely implemented in WLANs. Furthermore, even when QoS is enabled, QoS operates in terms of services and applications, not users. Therefore if visiting users connect their devices to the WLAN and use video streaming or VoIP services, they will receive higher priority than a regular user device downloading a file.

SUMMARY

Embodiments of the present disclosure are directed towards a modification of the behavior of the hub in order to provision for preferential performance being offered to devices of regular users of the network at the expense of visiting users.

In one aspect, an embodiment of the present disclosure provides an apparatus for managing a data network connected to a plurality of devices, comprising: a network controller for controlling operation parameters of the data network; a data store for storing identity information relating to a set of the plurality of devices which are privileged devices eligible for prioritized access to the data network; and a network monitor for monitoring performance characteristics of the network, wherein, the network monitor is operable to notify the network controller when utilization of the network exceeds a threshold level of activity, and in response to the notification, the network controller is operable to: determine that at least one privileged device is currently present on the wireless data network; notify the privileged device that prioritized access to the network is available; process a response from the privileged device; and if the response is indicative of a request for prioritized access, change at least one operating parameter of the network to provide prioritized access to the network for the privileged device.

In another aspect, an embodiment of the present disclosure provides a method for managing an access point maintaining a local area network and connected to a plurality of devices, at least one of the plurality of devices being a privileged device, the method comprising: monitoring network utilization of the network; and when the network utilization is determined to have exceeded a threshold level of activity, determining whether a privileged device is currently active on the network; notifying the determined privileged device that prioritized access to the network is available, processing a response from the privileged device, and if the response is a request for prioritized access, changing operational characteristics of the network to provide prioritized access to the network for the privileged device.

In a further aspect, an embodiment of the present invention provides a computer program product carrying processor executable instructions for causing a programmable processor to carry out a method of the disclosure.

BRIEF DESCRIPTION OF THE FIGURES

Embodiments of the present invention will now be described with the aid of the accompanying Figures in which.

DESCRIPTION

Figure 1:
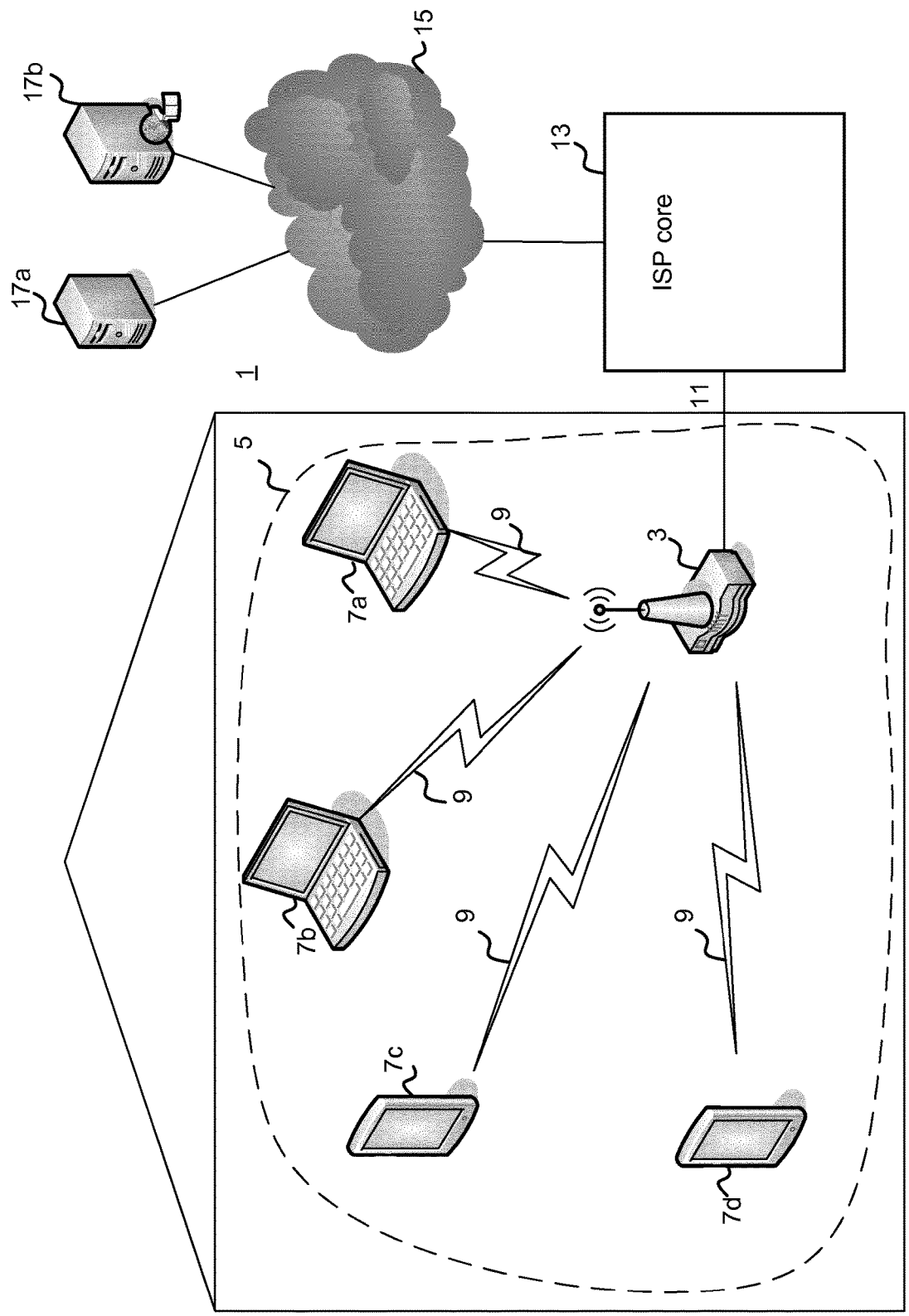
FIG. 1 schematically shows an example wireless network of wireless devices connected to a wireless access point operating in accordance with a first embodiment of the disclosure.

FIG. 1 illustrates an overview of a network system in accordance with a first embodiment. A user's home 1 or other local network environment is shown containing a number of networking components. A combined routing and wireless access point device 3 such as a BT Home Hub, or other similar combined routing and wireless access point device (hereinafter referred to as a hub 3) generates and maintains a wireless network (WLAN) 5 to enable data connectivity between a number of user devices 7 such as laptops, computers, smartphones and tablets within the home network environment. For ease of explanation, four exemplary devices are shown, two laptops 7a, 7b and two smartphones 7c, 7d. To better explain the first embodiment, the laptops 7a and 7b are exemplary devices of regular users of the WLAN 5, while smartphones 7c and 7d are devices of visitors to the WLAN 5.

In FIG. 1, the hub 3 and user devices 7 within range of the WLAN 5 are wirelessly linked using the IEEE 802.11ac variant of the Wi-Fi family of wireless protocols. The WLAN 5 is configured in infrastructure mode in which each device 7 in the network 5 is wirelessly connected to the hub 3 via a Wi-Fi link 9. Due to the transmission power and signal propagation limitations of Wi-Fi, the range of the wireless network 5 formed by the wireless access point 3 extends for several tens of meters around the hub 3 and data connectivity is generally limited to being within the home 1.

As is conventional, to enable communication between the devices connected to the WLAN 5 and external services not forming part of the WLAN 5, the hub 3 also has a copper/optical fiber data link 11 operating in accordance with the Very-High-Bitrate Digital Subscriber Line (VDSL) standards. The copper/optical fiber data link 11 connects the hub 3 to an Internet Service Provider (ISP) core network 13. The ISP network core 13 provides user management and control features for the user's account. The ISP network core 13 is connected to external Wide Area Networks (WAN) such as the Internet 15 and therefore allows data exchange between user devices and any external services provided by remote servers 17 such as video streaming and web services.

Overview Operation

During the normal operation of the WLAN 5, the hub 3 is configured to operate in a conventional manner whereby all user devices 7 are given the same opportunity to transmit and receive data in a "fair" manner. Therefore the transmission time windows and priority for traffic are the same for all devices.

When there are many regular and visiting devices 7 connected to the WLAN and using high bandwidth services, contention and congestion will often affect the performance of the WLAN for all users. A typical scenario would be a party or social gathering where all the guests ask to connect their devices to the host's WLAN.

In this scenario, the temporary increase in the number of connected devices and bandwidth consumption will affect the performance of the WLAN, and, it may cause a loss in performance for the regular devices which are normally connected to the network, primarily due to network contention.

To overcome this, in the first embodiment an administrator for the hub 3 can designate devices which are to be considered as "privileged" devices to the WLAN 5. The hub 3 is configured to monitor the network traffic over the WLAN 5 and when a number of performance metrics, such as bandwidth, is deemed to have exceeded a predetermined threshold value, the hub 3 will generate a policy based on the current state of the WLAN. The hub 3 will then locate the highest ranking privileged device and send a message to the user of that device asking whether they wish to have prioritized access to the network. If the response indicates that the user wants prioritized access, then policy is applied to a combination of the hub and the user devices connected to the WLAN in order to effect the prioritized access. In general the aim of the policy is to improve the performance of the WLAN for the privileged device by making changes to at least one operation parameter of the WLAN such as band steering, access control and quality of service.

During the period of priority access, the state of WLAN is continually monitored and when the overall network is no longer congested, or the privileged device disconnects from the WLAN, the policy is removed and the WLAN is returned to standard operation.

In this way, the hub 3 functions conventionally for most of the time but when network congestion occurs, the regular users of the WLAN can choose to be protected from the congestion so that they can continue to function normally at the expense of the WLAN performance for transient visiting devices.

System Components

Figure 2:
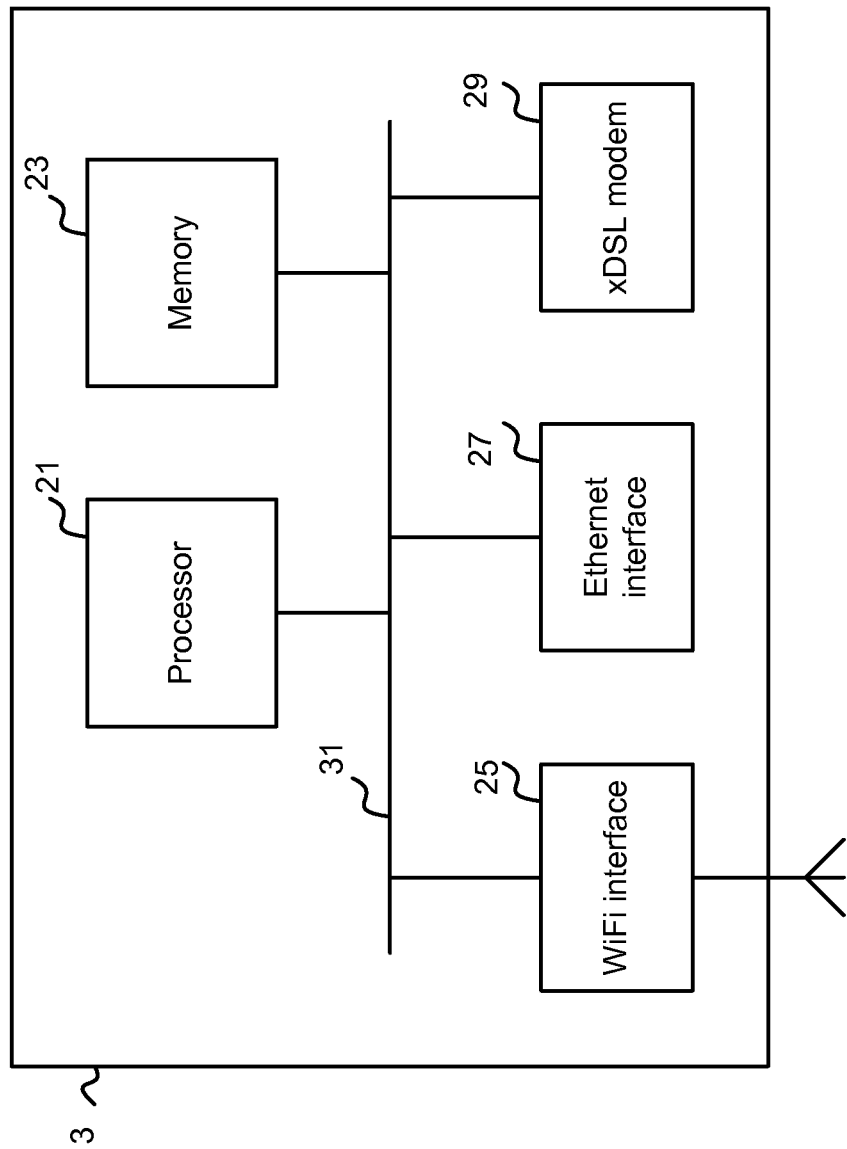
FIG. 2 schematically shows the physical components of a wireless access point illustrated in FIG. 1.

FIG. 2 shows the physical components of a hub 3 in the first embodiment. The hub 3 contains a processor 21 and a memory 23 for internal processing and hub functions. For external connectivity, the hub 3 has a Wi-Fi wireless interface 25 and a wired Ethernet interface 27 for communication with other wired local devices within the home network 5 and a WAN interface 29 for communication with remote devices 17 via the ISP core 13, in this embodiment the WAN interface 29 is a Very-high-bit-rate Digital Subscriber Line (VDSL) modem. The components are connected via a system bus 31.

To perform the processing according to the first embodiment, the memory 23 of the hub 3 contains computer program instructions which are executable by the processor 21 to define a number of functional software units. When these instructions are being executed, the hub 3 can be regarded as containing a number of functional units for collecting and processing data in accordance with the first embodiment.

Figure 3:
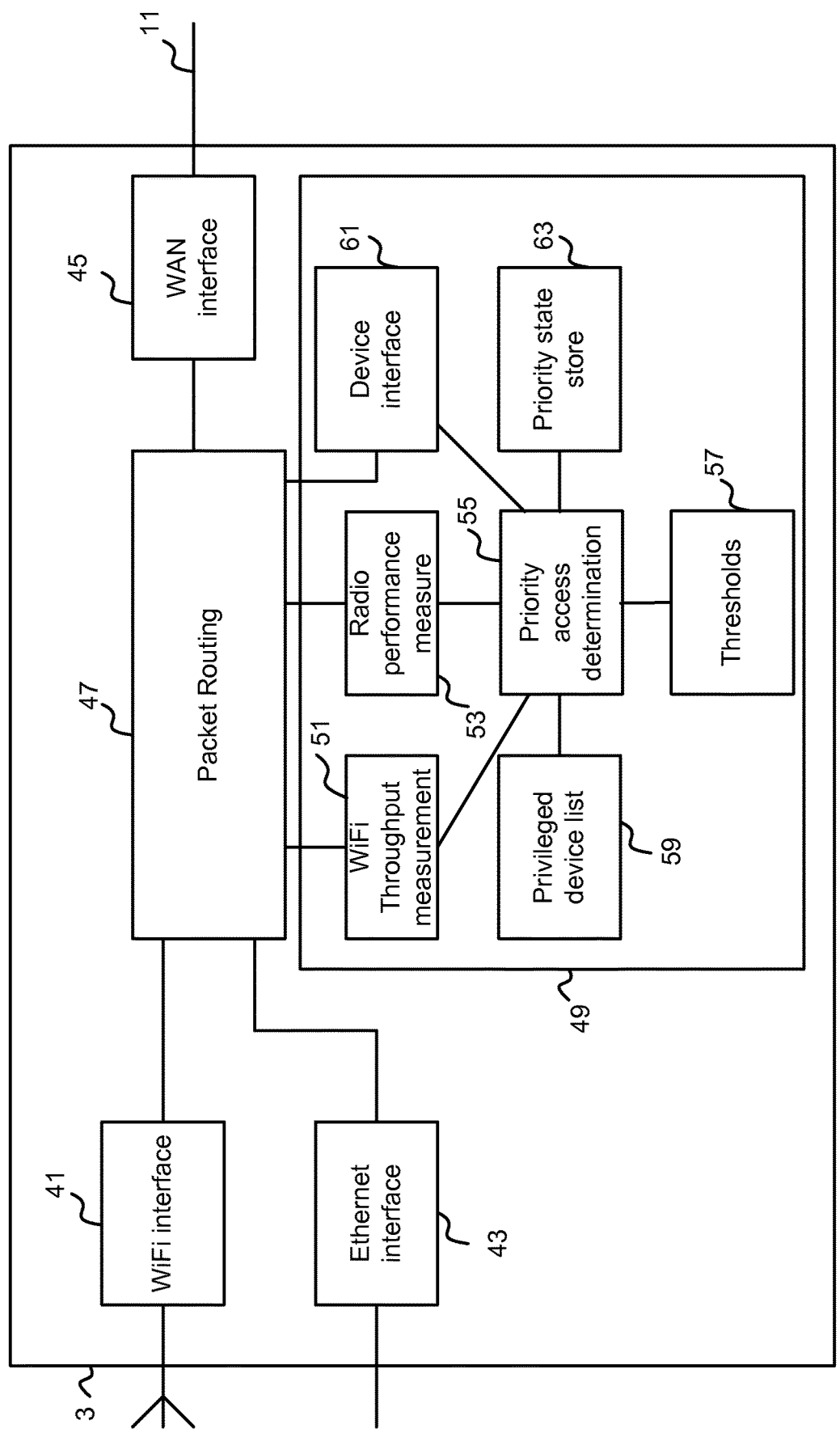
FIG. 3 schematically shows the functional components of the wireless access point when operating in accordance with the first embodiment.

FIG. 3 shows the functional components of the hub 3. For external connections, the hub 3 has a Wi-Fi interface 41, an Ethernet interface 43 and a WAN interface 45 each containing the hardware and software functionality corresponding to the physical Wi-Fi interface 25, Ethernet Interface 27 and VDSL modem 29 respectively. A packet routing function 47 routes packets between the different interfaces in accordance with packet information. The hub 3 also contains a prioritization controller 49 in accordance with the first embodiment to control the operation of the hub.

The prioritization controller 49 is responsible for monitoring the state of the connections to the various devices and determining when to offer priority access to certain devices in order to maintain a quality of experience for privileged devices, such as devices of regular local users, perhaps at the expense of visiting devices.

To determine the WLAN 5 state, the prioritization controller 49 contains a Wi-Fi throughput measurement monitor 51. This measures the total throughput for all devices sending and receiving data via the WLAN.

In addition to throughput, metrics about the radio interface are measured by a Radio performance measurement monitor 53. This unit measures physical characteristics of the radio signal such as signal to noise ratio and signal strength.

The measurement data obtained from the Wi-Fi and radio monitors 51, 53 are processed by a priority access determination unit 55 to determine the status of the WLAN. This unit compares information received from the Wi-Fi throughput measurement monitor 51 against thresholds of system usage stored in a threshold store 57 in order to determine when the WLAN is starting to become congested and overloaded with user traffic.

The thresholds stored in the threshold store 57 are set by the system administrator of the hub 3 in accordance with how aggressively the system should respond to increased utilization of the network. In this embodiment the threshold for throughput is set at 70% of the maximum throughput capacity of the network while the threshold for signal to noise ratio is set to 30 dB.

Since the available bandwidth of the WLAN varies with time due to external interference and the relative locations of the devices 7 to the hub 3, information from the radio performance measurement monitor 53 is compared against other thresholds such as upstream and downstream retry rates and/or PHY rates to provide further information about the status of the WLAN and the derived information is also used in determining a policy for enabling prioritized access.

The priority access determination unit 55 compares data from the performance measures against the stored thresholds values in order to determine whether the WLAN 5 has reached a utilization level whereby prioritization may be beneficial to privileged users.

To enable the priority access determination unit 55 to determine the identity of a privileged device on the WLAN 5, a privileged device list 59 contains an ordered list of the devices which are eligible for prioritized access within the network, hereinafter referred to as privileged devices. The entries in the privileged device list 59 are pre-populated by the system administrator for example to indicate that laptop 7a is the highest priority device while laptop 7b is the second highest priority device. Smartphones 7c and 7d are visiting devices and therefore there is no corresponding entry in the list 59.

The priority access determination unit 55 is configured to find a current highest priority privileged device by comparing the set of devices determined by the WiFi interface 41 to be connected to the WLAN 5 against the privileged device list. In this embodiment, regardless of the number of privileged devices connected to the WLAN, the priority access option is only offered to the current highest ranking privileged device. In this example, although devices 7a and 7b are connected the WLAN, device 7a is determined to be the highest privileged device listed in the privileged device list 59.

In addition to identifying network congestion and a privileged device, the priority access determination unit 55 is also configured to generate a candidate policy to enable priority access for a privileged device to the WLAN. The policy defines changes to a number of operation parameters of the WLAN 5.

For example:
Band steering—Moving devices between the available Wi-Fi bands in order to give the privileged device more airtime.
Quality of Service controls—Altering the relative downstream QoS of the privileged device so that it gains more airtime than the other devices.
Access control—Blocking access to the WLAN for some devices by disassociating them from the band they are on (i.e. kicking them off) devices and not letting them re-associate on that band until the congestion has abated.

The combination of WLAN operational parameters are chosen on the basis of the current network conditions and properties of the privileged device.

In this embodiment, the priority access is not automatically applied to the privileged device and WLAN. This is to allow the context of the user to determine whether prioritized access is required. For example, if the user of the privileged device is participating in a video call or watching streaming video, then deterioration to the WLAN will be disruptive and therefore privileged access will be beneficial. However, if the privileged device is only being used for low bandwidth or applications where latency is not important, for example, sending instant messages, reading web pages or certain file transfers, the user may not consider prioritized access to be required and therefore there is no need to change the operational parameters of the WLAN. Applying the prioritized access incurs a computing overhead and can potentially affect the performance of all non-privileged devices, so not applying the prioritized access can be beneficial when the user of the privileged device knows that the visiting devices need to do something important.

The prioritization controller 49 has a device interface 61 to communicate with WLAN devices. The device interface is configured to generate and send a message to the privileged device to ask whether the user wishes to have prioritized access. If the device interface 61 receives a response from the user of device 7a indicating that prioritized service is required, then the priority access determination unit 55 will apply the generated policy to the configuration of the hub 3 and privileged device 7a to improve service for the privileged device 7a. The device interface 61 is used to send configuration instructions to the privileged device 7a and in some cases to the other non-privileged devices connected to the WLAN.

Once a priority access state has been activated, the priority access determination unit 55 updates the data in the priority state store 63 to indicate that the priority state is active, details of the operational parameters applied in the policy and the identity of the privileged device which is receiving priority access.

In the case where the response message indicates that the user does not want to activate priority access, then no priority access conditions are enabled. An entry is placed in the priority state store 63 to indicate that there is no active priority access policy.

In this embodiment, the priority access state is enabled in accordance with the network conditions. Therefore the duration of the priority access is not fixed, but instead determined by a decrease in the network utilization.

The Wi-Fi throughput measurement monitor 51 and radio performance monitor 53 are configured to run continuously to measure the current state of the Wi-Fi throughput and radio performance.

The priority access determination unit 55 periodically receives the metrics from the Wi-Fi throughput measurement monitor 51 and the radio performance monitor 53 and compares the values against a different lower threshold stored in the thresholds store 57.

When the combined WLAN activity metrics are determined to be below the thresholds, then there is no need for the prioritized access and so the prioritization techniques applied by the hub 3 are cancelled or reversed.

Furthermore, if device 7a disconnects from the WLAN, then prioritized access is cancelled and the priority access determiner unit 55 checks the list of connected devices against the privileged device list, to determine the new highest ranking privileged device which in this example is the laptop device 7b. Whilst device 7a is disconnected, if the network activity increases above the threshold, then device 7b will be offered prioritized access. When device 7a reconnects, the priority access determination unit 55 will revert to offering device 7a prioritized access.

Flowcharts

Figure 4:
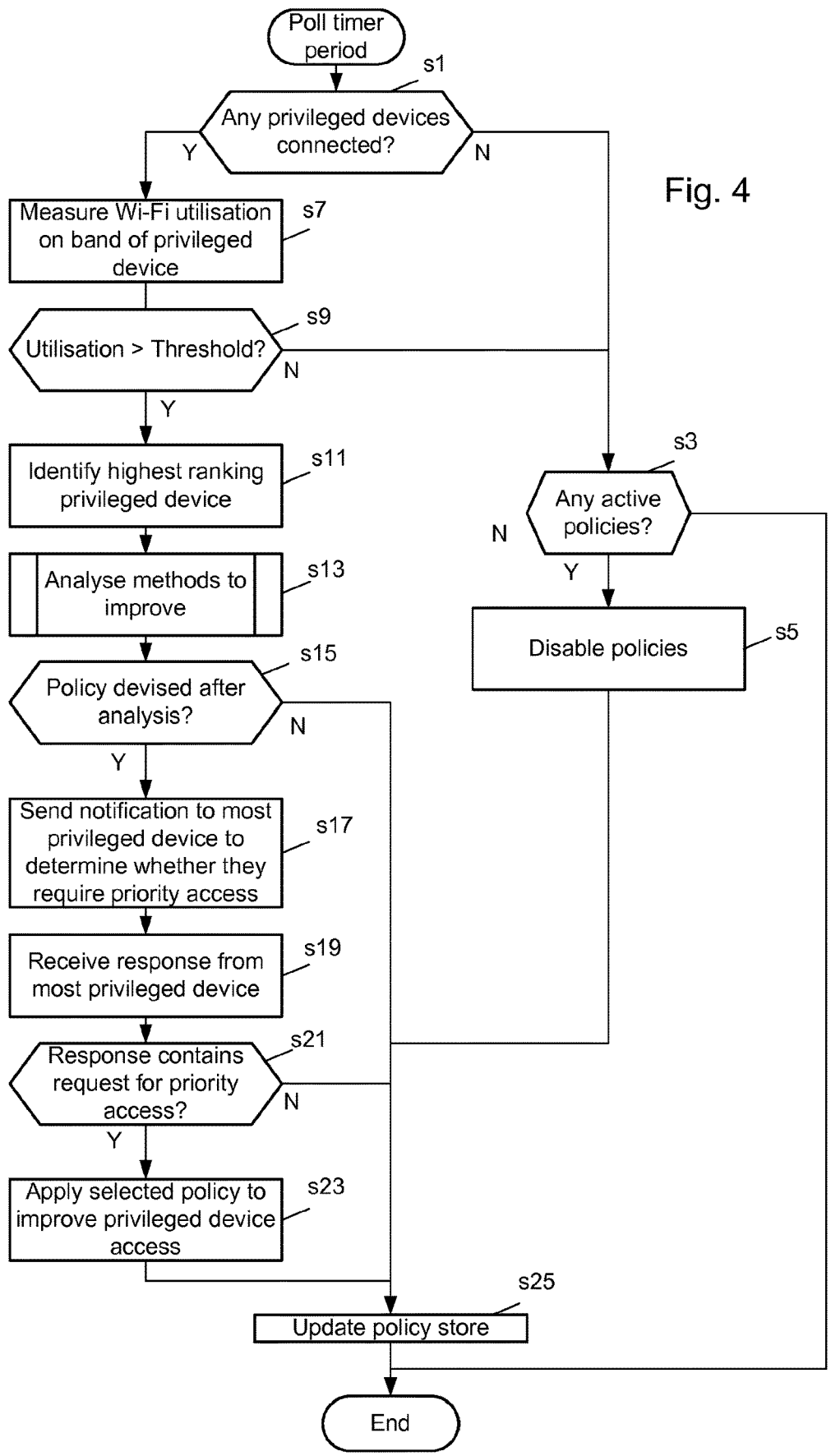
FIG. 4 is a flowchart showing the operation of the wireless access point to provide priority access to a privileged device within the wireless network.

FIG. 4 shows the operation of the priority access determination unit 85 in the first embodiment. At regular intervals, the prioritization controller is arranged to perform the following processing. In this embodiment, the polling period is 300 seconds to maintain a balance between processing overhead and network response time.

In s1, the priority access determination unit 55 compares the set of devices currently connected to the WLAN against the device priority list 59 to determine whether any privileged devices are currently connected to the WLAN 5.

If there are no privileged devices connected, then a clean-up subroutine is carried out in s3 if necessary. The priority access determination unit 55 checks in s3 whether any policies are active. If there no active policies, then processing ends.

Alternately, if the priority state store indicates that a policy is active, then in s5 the policies are disabled/reversed since any previously deemed privileged device has disconnected from the network and priority access is no longer required. After s5 processing moves to s25 which will be described later.

In the event that s1 indicates a privileged device is connected to the WLAN, then processing moves to s7 where the Wi-Fi utilization for the Wi-Fi bands are measured by both the Wi-Fi throughput measurement 51 and radio performance measurement unit 53. These units collect a number of metrics including:

Per-band metrics
   Overall air utilization for each band
   List of associated devices for each band
Per device metrics
   Current band
   Air utilization
   RSSI of Device
   PHY rate (upstream and downstream)
   Data rate (upstream and downstream)
   Retries (upstream and downstream)

In s9 the priority access determination unit 55 retrieves various activity thresholds from the threshold store 57 and compares the measured data against the thresholds. If the current Wi-Fi utilization value is below the thresholds, then processing also moves to s3 explained above. Since there are connected privileged devices but the network utilization is below the various thresholds, then any previously applied prioritized access conditions are no longer required and should be removed/reversed so that the WLAN performs in a conventional manner. After s3 and possibly s5 processing ends.

However if, in s9 the utilization value is above the threshold, then in s11 the highest ranking of the connected privileged devices is identified. In the example above, device/laptop 7a is the highest ranking device.

Once identified, processing moves to s13 where the priority access determination unit 55 tries to generate a policy of actions which may improve the performance of the network for the privileged device.

Figure 5:
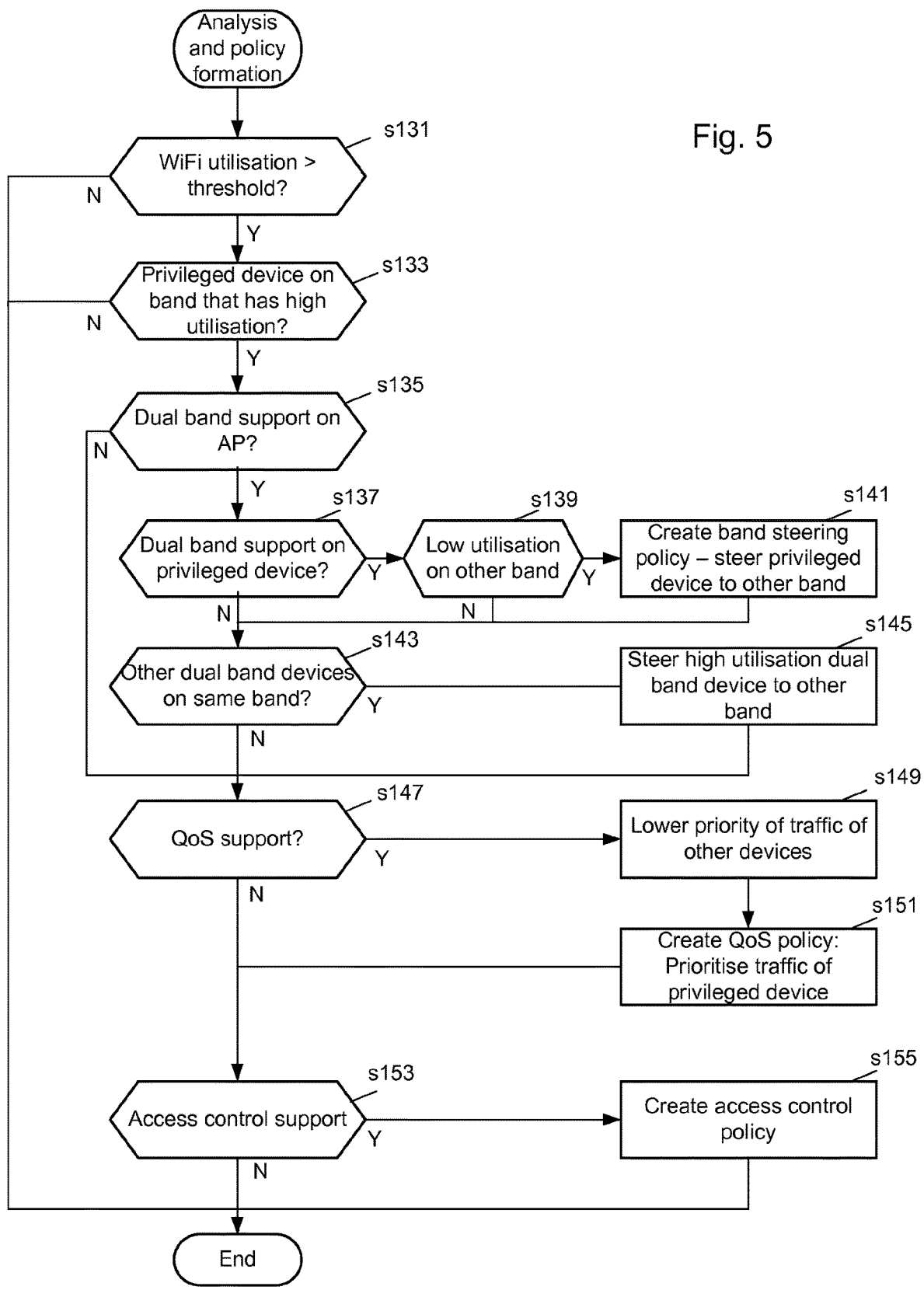
FIG. 5 is a flowchart showing the operation to generate a policy to enable prioritized access.

More details for this are shown in FIG. 5.

In s131 the Wi-Fi utilization is again compared against the threshold value, if the threshold is no longer exceeded, then processing ends.

However, if the threshold is exceeded, then in s133 a test is carried out to determine whether the privileged device is connected to a band which has high utilization. If it is not, then processing ends.

If the privileged device is connected to a band experiencing high utilization, then the priority access determination unit 55 will determine whether the throughput for the privileged device can be improved. In this embodiment, there are a number of operational parameters which can be altered by the policy:

Band steering
   Move other device(s) to a different Wi-Fi band to free up capacity on the congested band;
   Move the privileged device to a different Wi-Fi band with more capacity;
Quality of Service
   Raise the priority level of the privileged device's WLAN downstream traffic Lower the priority level for other devices' WLAN downstream traffic Access control Send Wi-Fi Disassociate command to other devices using the same band as the privileged device and then refuse subsequent connection requests from the disassociated devices on the band used by the privileged device for a preset period of time, or until the privileged device disconnects from the WLAN.

Band Steering

In s135, a test is carried out to determine whether the hub 3 itself supports dual band Wi-Fi, namely operation on both the 2.4 Ghz and 5 Ghz frequency bands. If the hub does not support dual band Wi-Fi then processing proceeds to s147 relating to QoS as will be explained later.

If dual band Wi-Fi is supported by the hub, then in s137 the privileged device is tested to determine whether it supports dual band Wi-Fi. If dual band Wi-Fi is supported by both the hub 3 and the privileged device then in s139, a further test is performed to determine whether the Wi-Fi band which is not used by the privileged device has low utilization. If there is low utilization of the other band, then in s141, a part of the policy is formed to move the privileged device to the other band which is not being utilized as heavily. Processing then proceeds to s143. In contrast, if in s139 the determination is that there is high utilization on the other band then it would not make sense to move the privileged device to the other band and therefore s141 is skipped and processing moves directly to s143.

In s143, a test is performed to see whether other dual band devices are connected to the same band, or same new band if s141 was performed, as the privileged device. This will involve testing each connected device in a conventional manner. If s143 determines that there are dual band devices on the same band, then processing moves to s145 where a policy rule is generated to move dual band devices to the other band to minimize contention on the privileged device band. After this step, the band steering operating parameter has finished and processing moves to s147. In the event that there are no other dual band devices on the same band as the privileged device and therefore processing moves directly to s147.

QoS

After the Wi-Fi band steering policy settings have been tested and set in s135 to s143, the QoS policy operating parameter options are tested. In s147, the hub 3 is tested to determine whether it supports QoS options. If the hub does not support QoS controls, then processing moves to the Access Control policy options which will be described with regard to s153 later.

If QoS is supported, in s149, the policy is updated with settings to lower the priority of data traffic generated by or delivered to non-privileged devices. Next, in s151, the policy is updated to raise the priority level of all upstream and downstream traffic for the privileged device. Processing then moves to s153.

Access Control

In s153, the hub 3 is tested to determine whether it supports access control. This access control operating parameter will bar certain devices from the WLAN in order to decrease the number of devices on the WLAN and thereby improve the performance/experience for the remaining devices.

If the hub 3 does not support access control, then processing ends for the policy generation and processing returns to FIG. 4. Alternatively, if the hub does support access control, in s155, the policy settings are updated to implement access control by the hub on some of the devices in the WLAN. This can be implemented in many ways for example by identifying the devices with the lowest utilization over a set period of time and blocking access. Processing then ends for the policy generation and processing returns to FIG. 4.

Returning to FIG. 4, after the processing of s13 described above and shown in FIG. 5, a test is carried out in s15 to check whether a policy was successfully devised. If there was no generated policy, then the processing moves to s25 described later and the current network situation is maintained.

If a policy has been generated, then in s17, the device interface 61 sends a message to the identified highest ranking connected privileged device to ask the user of the device whether they would like to enable the priority access mode for their privileged device.

In a basic configuration, the message will provide the identified privileged device with a simple choice, for example:

"Wi-Fi congestion detected. Do you wish the AP to improve your network access settings at the expense of other devices?

[yes]/ [no]"

For certain privileged devices, the administrator of the WLAN may have specified that the prioritization controller should interact in an advanced mode. In this case, the message provides the user with a degree of control in deciding how their network access is improved. For example:

"Wi-Fi congestion detected. Select one option:

Move your device to a less congested Wi-Fi band (band steering)

Move the specified device(s) to another Wi-Fi band:
[Connected device 1]
[connected device 2]
[connected device N]

Raise your traffic priority level relative to the specified devices:
[Connected device 1]
[connected device 2]
[connected device N]

Remove the specified device (s) from the congested Wi-Fi band and deny subsequent access while privilege mode active:
[Connected device 1]
[connected device 2]
[connected device N]

In the advanced mode, the user is assumed to be more knowledgeable about the network and therefore the option selected by the user is used as the policy for the system.

There are various ways in which the device interface 61 can communicate with the user of the privileged device. In this embodiment, to minimize alterations to the privileged devices 7, the device interface 61 is configured to simply email the privileged device since the user is assumed to be actively using the privileged device and therefore will have access to an email client on the device. The selectable message options are configured as links which will result in a response being sent to the hub identifying the user selection option.

In s19 the device interface receives a response from the highest ranking privileged device and in s21 the response message is processed to determine whether the user agrees to prioritized access. As explained above, the context of the user as well as the services active on the privileged device will determine whether prioritized access is required.

If the response indicates that priority access is not required, then in s25 the priority state store 63 is updated and processing ends. However, if the user does require prioritized access, then in s23 the generated policy settings are applied to the hub 3, the privileged and other non-privileged devices on the network. The prioritization controller 49 configures any QoS and access control operational parameters on the hub and band steering instructions for the privileged and non-privileged devices are delivered via the device interface 61 to effect those operational parameters in a conventional manner.

In s25 the priority state store is updated to record changes to the configuration of the WLAN. The updates depend on the preceding step of the operation flow chart.

If a new policy is created and applied after s23, the priority state store 63 is records details of the new policy and the associated privileged device;

if, after s21 the response message indicates that prioritized access was not required, an entry is made in the priority state store 63 to log the refusal and device identity;

after s15 if no policy could be devised, then an entry is made in the priority state store 63 to record that a policy could not be generated for that privileged device; and after s5, the priority state store 63 is updated to indicate that the previous priority state is no longer active.

After the priority state store 63 has been updated, the processing for the prioritization controller ends for this monitoring period.

With the above processing, the WLAN can respond to network utilization levels to provide a subset of the devices of the network deemed to be privileged devices with the option of improved service. However, the decision of whether or not to implement the improved service is dependent on a user of the privileged device approving the option which may be based on the context of the user.

Although the operation of the prioritization controller is particularly effective when a large number of visiting devices join the WLAN, the operation is equally applicable when there are no visiting devices on the WLAN but there is high network utilization between a set of regular WLAN devices or even between a set of privileged devices. In each case the prioritization controller will determine a policy for the most privileged device and offer the user of the most privileged device the option to improve network performance for that device at the expense of the other devices.

Alternatives and Modifications

In the embodiment, the threshold values for congestion are fixed values. In an alternative, the thresholds have different values at different times of day, or on different days. For example the privileged device could be prioritized during working hours set by the user or based on the times read from an Electronic Programme Guide (EPG) so that certain TV shows get priority for the privileged device.

In the embodiment, the processing to provide priority access is carried out whenever there is an increase in network traffic which exceeds a threshold. The priority access condition is maintained until the network utilization decreases or when the next polling period of the priority access determination unit determines that the priority device is no longer connected to the WLAN.

This may lead to periods of time where the device has priority access even if it is no longer needed. In an alternative, when a device is given priority access conditions, the priority access determination unit starts a clock timer defining the maximum period of time that a device should be provided with priority access.

Similarly, in a further alternative, when a device is provided with priority access, a minimum timer is activated so that priority access is not removed before the expiry of the minimum period. This is useful to prevent a large number of messages being sent to the device when access to the WLAN is limited due to congestion which may cause the device to disconnect and re-connect due to congestion.

In the embodiment, the device interface is configured to email the user of the privileged device. It will be clear to the skilled person that other options are possible. In one alternative the hub is arranged to use an HTTP and HTML scheme so that the options are presented in a browser either as an interstitial HTML page, or as an HTTP redirect.

In a further alternative, the device interface uses push notifications. The user devices will require applications which have registered with a third party push notification server such as the Google Cloud Messaging platform GCM, or the iOS Apple Push Notification Service. When the user interface wishes to send a notification, it creates a hub based HTML page with the notification contents and sends the third party push notification server a URL to the HTML page. The third party push notification server will then forward the notification to the device using a standard push notification mechanism. Upon receipt of the push notification by the device, a popup message appears on the screen on the device which presents the user with a URL that the user can access in order for the notification HTML page to be displayed on the device web browser.

In a further alternative, a proprietary system is used whereby a dedicated app is pre-installed on the each of the priority devices. The app is configured to listen to a predetermined TCP/UDP port and the notifier is configured to contact priority devices via their predetermined TCP/UDP ports with the notification. At the recipient user device, the notification is displayed and when the user selects an option, the devices sends the response back to the notifier via the TCP/UDP port.

A further benefit of the dedicated app is that the user of a privileged device can pre-emptively request prioritized access in anticipation of an increase in network activity. In this way prioritized access can be enabled before the visiting devices connect or cause a surge in activity, or enabled as soon as the activity increases.

In the embodiment, the priority access determination unit is configured to identify and offer priority access to the single highest ranking privileged device. In a modification, more than one device can be offered priority access.

In the embodiment, the prioritized access is offered to privileged Wi-Fi devices, however the similar techniques can be applied in any shared channel network architecture such as Ethernet or another wireless network protocol.

The invention claimed is:

1. A wireless access point for managing a wireless local area network connected to a plurality of wireless client devices, the wireless access point comprising:

a network controller for controlling operation parameters of the wireless local area network;

a data store for storing identity information relating to a set of the plurality of wireless client devices which are privileged devices eligible for prioritized access to the wireless local area network; and a network monitor for monitoring performance characteristics of the wireless local area network, wherein, the network monitor is operable to notify the network controller when utilization of the wireless local area network exceeds a threshold level of activity, and in response to the notification, the network controller is operable to:
  access the data store to determine that at least one privileged device is currently present on the wireless local area network;
  notify the privileged device that prioritized access to the wireless local area network is available;
  process a response from the privileged device; and
  if the response is indicative of a request for prioritized access, change at least one operating parameter of the wireless local area network to provide prioritized access to the wireless local area network for the privileged device,
and wherein the network monitor is further operable to notify the network controller when the network utilization falls below a second threshold level of activity and in response the network controller is operable to disable the prioritized access for the privileged device.

2. The wireless access point according to claim 1, wherein the network controller is operable to disable the prioritized access when the privileged device is determined to have disconnected from the wireless local area network.

3. The wireless access point according to claim 1, wherein the network controller is operable to generate a policy containing a set of operating parameters to be changed in order to implement the prioritized access.

4. The wireless access point according to claim 1, wherein the at least one operating parameter includes at least one of wireless network band steering, Quality of Service or access control.

5. The wireless access point according to claim 1, wherein different threshold values are used by the network monitor at different times.

6. A method for operating a wireless access point maintaining a wireless local area network and connected to a plurality of wireless client devices, at least one of the plurality of wireless client devices being a privileged device, the method comprising, by the wireless access point:
  monitoring network utilization of the wireless local area network; and
  when the network utilization is determined to have exceeded a threshold level of activity,
    accessing a data store storing identity information relating to a set of the plurality of wireless client devices which are privileged devices eligible for prioritized access to the wireless local area network;
    determining whether a privileged device is currently active on the wireless local area network;
    notifying the determined privileged device that prioritized access to the wireless local area network is available,
    processing a response from the privileged device,
    if the response is a request for prioritized access, changing at least one operating parameter of the wireless local area network to provide prioritized-access to the wireless local area network for the privileged device, and
    wherein prioritized access for the privileged device has been provided, when the network utilization falls below a second threshold level of activity, disabling the prioritized access for the privileged device.

7. The method according to claim 6, further comprising determining when the privileged device has disconnected from the wireless local area network and disabling the prioritized access.

8. The method according to claim 6, further comprising generating a policy containing a set of operating parameters to be changed in order to implement the prioritized access.

9. The method according to claim 6, wherein the at least one operating parameter includes at least one of wireless local area network band steering, Quality of Service or access control.

10. The method according to claim 6, wherein different threshold values are used at different times.

11. A non-transitory computer-readable storage medium storing a computer program product carrying processor executable instructions for causing a programmable processor to carry out the method according to claim 6.

* * * * *